March 24, 1970 A. O. CHRISTENSEN 3,502,908

TRANSISTOR INVERTER CIRCUIT

Filed Dec. 26, 1968 2 Sheets-Sheet 1

INVENTOR:
A. O. CHRISTENSEN

INVENTOR:
A.O. CHRISTENSEN

United States Patent Office 3,502,908

Patented Mar. 24, 1970

3,502,908

TRANSISTOR INVERTER CIRCUIT

Alton O. Christensen, Houston, Tex., assignor to Shell Oil Company, New York, N.Y., a corporation of Delaware Continuation-in-part of application Ser. No. 761,450, Sept. 23, 1968. This application Dec. 26, 1968, Ser. No. 787,067

Int. Cl. H03k *17/60, 19/40*

U.S. Cl. 307—246 6 Claims

ABSTRACT OF THE DISCLOSURE

An inverter circuit for field-effect transistors comprising two transistors having common source and drain electrodes. The common drain and one of the gate electrodes are connected to a source of clock pulses while the other gate electrode is connected to a source of data pulses. The common source is connected to ground through a capacitor and the circuit output is taken at the common source electrode. The clock and data pulses are synchronized so that the trailing edge of the data pulse occurs subsequent to the trailing edge of the clock pulse by an amount of time, $\tau$, sufficient for the capacitor to be discharged into the clock circuit.

Cross reference to related applications

This application is a continuation-in-part of applicant's copending application Ser. No. 761,450, filed Sept. 23, 1968, and titled Transistor Inverter Circuit.

Background of the invention

The invention relates to insulated gate field effect transistor (IGFET) inverters. Inverter circuits perform the logic function of converting a logical "1" to a logical "0" and are a fundamental building block in many digital circuits. Thus, improvements in inverter circuits would have a far reaching effect and prove very beneficial to the industry.

One of the major criteria on determining commercial success of a circuit is cost. In integrated circuit form, cost is closely related to the physical size of a circuit. The smaller they are the cheaper they are. The present invention improves on the prior art by substantially reducing the size of the IGFET inverter circuits.

Brief description of the drawing

The background of the invention, the contribution of the invention, and a preferred embodiment will now be discussed in connection with the drawing wherein.

Figure 1:
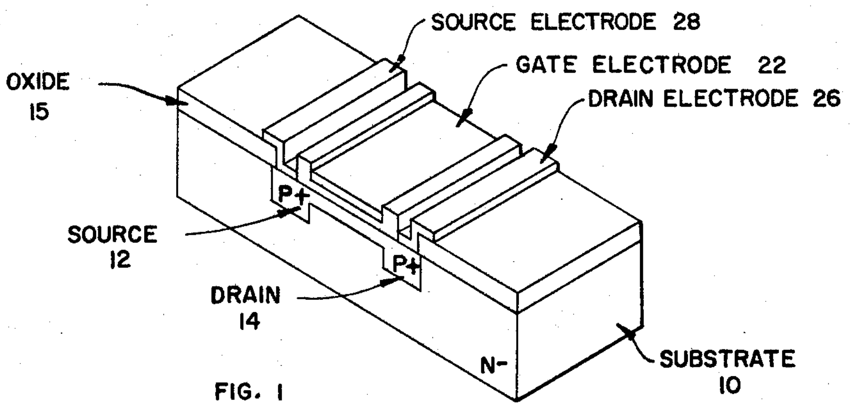
FIGURE 1 is an isometric view generally showing the construction of a MOSFET.

To better appreciate the contribution of the present invention and its relationship to the prior art, it is helpful to have a basic understanding of field-effect transistors and how they are used to make electric circuits.

The term "transistors" refers to electronic components made out of semiconductor material and having the ability among others to amplify electric signals and act as a switch. The most common type of transistor, called bipolar because one end is electrically different from the other, has three terminals all of which make physical contact with the semiconductor material of the transistor. Field-effect transistors, by contrast, have only two terminals that make physical contact with the semiconductor material while the third terminal interacts with the semiconductor material across an insulator by means of an electric field (which accounts for the name).

Field-effect transistors can conveniently be broken down into the junction-type and the insulated-gate type (IGFET). Of the IGFET-type, the metal-oxide silicon field-effect transistor (MOSFET) is presently the most popular because it is the easiest to make. Since the present invention is concerned primarily with IGFET's, it will be explained with reference thereto, and specifically with reference to the MOSFET.

To understand how MOSFET circuits operate, it is valuable to understand the structure an doperation of the actual MOSFET transistor.

To start with, all transistors are made out of a single crystal of some semiconductor material. The two semiconductors of greatest importance in electronics are germanium and silicon. These elements are located in the fourth column of the Periodic Table and have four valence electrons. The crystal structure of germanium or silicon follows a tetrahedral pattern with each atom sharing one outer or valence electron with each of four neighboring atoms. Electrical conduction takes place in a pure semiconductor when the crystal has enough energy (usually from heat) to cause a few valence electrons to break the bonds holding them in the crystal. When a bond is broken a vacancy in the crystal, called a hole, is left. The region in which the vacancy exists has a net positive charge; the region in which the freed electron exists has a net negative charge. In such semiconductors both electrons and holes contribute to electrical conduction. If an electron from another broken bond fills the hole the vacancy appears in a new place and the effect is as if a positive charge has moved to a new location.

Basic to the manufacture of transistors is the fact that electrical conduction can be increased greatly and to a precisely controlled extent by adding small amounts of impurities to a single crystal of semiconductor material. This is known as doping. Doping impurities are generally chosen from either the third column or fifth column in the Periodic Table and actually replace a silicon atom in the crystal structure or lattice (assuming silicon is being used). When an atom from Group 5 replaces a silicon atom in the crystal lattice, only four of the electrons are needed to complete the crystalline bonds; the remaining electron becomes a free electron available for conduction. The resulting material is called an n-type semiconductor because of the presence of negative charge carriers in an electrically neutral crystal. If a small amount of Group 3 atoms are added to otherwise pure silicon, a p-type semiconductor material is obtained. For example, when a trivalent atom replaces a silicon atom in the crystal lattice, only three electrons are available to complete bonding to the lattice. If the remaining unfilled bond is filled by an electron from a neighboring atom, a mobile hole is created and there is the possibility of current conduction by the motion of positive charges. Used in this way, an atom from Group 3 is called an acceptor atom because it accepts electrons. By adding donor or acceptor atoms in small amounts, the conductivity of a semiconductor can be increased enormously.

The transistor in FIGURE 1 has a substrate 10 made from n-type semiconductor material and has two regions 12 and 14 built into it that are p-type material and are known by convention as the source and drain. Covering the top of the semiconductor is a layer of protective material 15 which would be silicon dioxide if silicon semiconductor were used. Typically, the p-type silicon regions are made by diffusing a p-type impurity into the n-type silicon substrate through windows etched in the silicon dioxide.

The silicon dioxide performs at least two basic functions. First, as just stated it is used as a mask through which p-type impurities are diffused into the substrate in specified regions. It is used to protect the silicon substrate from contamination and its insulation properties are used to electrically isolate parts of the electrode from the silicon. Metallic contacts 28 and 26, called electrodes, are deposited over the exposed silicon area in the source and drain. The gate electrode 22 is a metallic conductor deposited over the oxide between the source and drain and separated from the source, drain, and substrate by the oxide.

Figure 2:
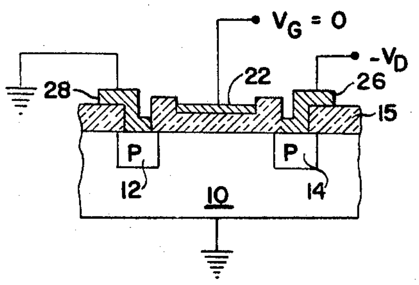
FIGURE 2 is a cross-sectional view of a MOSFET illustrating its structure when it is nonconducting.

The operation of a MOSFET is best illustrated with reference to FIGURES 2 and 3. FIGURE 2 illustrates the condition of a MOSFET with the source and gate electrodes grounded and with a negative voltage on the drain. Since there is a voltage differential between the source electrode and drain electrode, electric current would flow therebetween if there were a conductive path. But with the gate voltage at zero volts, the two p-regions of the transistor remain isolated from each other and prevent the flow of electric current therebetween.

Figure 3:
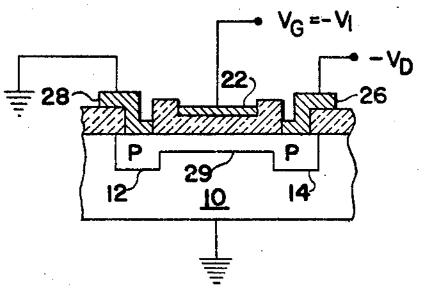
FIGURE 3 is a cross-sectional illustration of a MOSFET when it is conducting.

FIGURE 3 illustrates the condition of the transistor when it is capable of conducting an electrical current between its source and drain. Conduction occurs as electrons are able to flow through the source electrode into the p-region beneath the source electrode and along a p-channel 29 existing between the source p-region and the drain p-region. Finally, the electrons are able to flow out through the drain electrode. The transistor condition illustrated in FIGURE 3 is created by applying a negative voltage to the gate electrode. When the gate voltage is at zero, the transistor condition is as depicted in FIGURE 2. However, as a negative voltage is applied to the gate, electric field is set-up between the gate and substrate which repels electrons away from the surface of the substrate beneath the gate. As the gate voltage becomes increasingly negative, a p-type channel of electron-scarce silicon is created immediately beneath the oxide layer extending between the two p-regions. This is known as inversion. The p-channel provides a path for the conduction of charge carriers between the source and drain such that with a negative voltage on the drain and the source at ground, or vice versa, a current will flow through the p-channel.

Before the surface can be inverted to form a p-channel, the gate voltage must reach a certain critical level called the threshold voltage, $V_t$ which physically is the voltage necessary to repel a sufficient number of electrons away from the surface to neutralize the surface charges. The value of $V_t$ depends on the quality of the process by which the transistors are made and is presently in the range of minus 2 to minus 5 volts. As the gate voltage, $V_G$, becomes more negative than $V_t$, the channel depth, and hence the conduction path, increases. By varying the gate voltage, it is possible to modulate the size of the channel and thereby control the amount of current flowing in either direction through the transistor. This mode of operation makes the FET unique in that current flows equally well in either direction. The resistance to current flow presented by the p-channel is called the on-resistance of the transistor and is very small when compared to the resistance of the transistor with no signal on the gate, called the off-resistance. For example, the off-resistance may be several million ohms whereas the on-resistance may typically be between 500 and 5,000 ohms.

The MOSFET described above is known as a p-channel enhanceemnt mode device because a p-type channel is induced, that is enhanced, by the application of voltage to the gate. If a channel exists at $V_G=0$, the device is known as a depletion mode device. Other types of MOSFET's operate in a p-channel depletion mode, n-channel enhancement mode, and n-channel depletion mode. The present invention applies equally well to all of the above devices.

In circuit applications, the FET is used in much the same way as vacuum tubes or conventional bipolar transistors. For example, in communications applications they are often used as amplifiers, whereas in digital applications they are often used as switches. Because vacuum tubes and bipolar transistors came into popular use well before FET's, they, particularly the bipolar transistors, are presently used in more applications. However, FET's possess some inherent advantages that will likely enable them to capture a substantial portion of the applications presently handled by bipolar transistors. Some of the advantages of the FET are small size, reduced power dissipation, mechanical ruggedness, and nearly complete isolation of input from output.

But it is probably in the field of integrated circuits that FET's will achieve their greatest success. Generally, integrated circuits consist of many transistors all made and interconnected into circuits in a single piece of monocrystalline silicon, each piece being called a chip. Most often it is desirable to make as many circuits per chip as possible. Since each chip goes through each step in the manufacturing process, it costs substantially the same money to make a chip regardless of whether it has 1 or 100 circuits integrated in it. Thus, other things being equal, the cost per circuit depends on the number of circuits per chip. It is therefore a major objective of any circuit design and particularly of this invention to minimize the chip surface area used by each circuit. This can be done generally by reducing the number of transistors per circuit or by reducing the amount of metallized area on the chip surface, called conductor lead, used to interconnect the transistors or by reducing the chip area devoted to making input/output (I/O) contacts.

Conductor lead area consists of very narrow ribbons of metal deposited on the chip surface and is used to interconnect the various transistors, resistors and capacitors on a chip into circuit. In chip surface area, a lead usually takes as much room per circuit as a MOSFET.

I/O contact areas are needed to make electrical connection between the chip and the external package in which the chip is located. Each I/O connection requires a bonding pad (an area to which thin wires may be attached) that individually consumes upwards of forty square mils of silicon surface areas as contrasted with less than one square mil used by a MOSFET. Because the circuits on a given chip do not operate without reference to outside circuits, a certain number of I/O's are necessary. However because of the relatively large chip surface area consumed by I/O bonding pads it is always desirable to minimize the number of I/O's per chip. It is therefore an objective of this invention to make a circuit having a reduced number of I/O connections.

The present invention attacks these problems very strongly in two ways. First, the invention eliminates the need for a D.C. power supply. Thus, since D.C. power must be brought in from some source external to the chip, an I/O lead is eliminated. Furthermore, since D.C. power must be supplied individually to each circuit, a lead winding back and forth across the chip and contacting each circuit is eliminated.

When combining circuits in a digital system, it is common practice to use a timing clock to make sure that some circuits don't race ahead of others and cause false logical results. The clock or a source of clock pulses, $\phi$, is generally attached to each circuit in the entire system and effectively allows the circuits to operate only while a clock pulse is present at a particular circuit. Some prior art circuits need two clocks and a data source (commonly called a two-phase clock) for proper operation. The present invention improves substantially on the two-phase clock circuit since these circuits require two clock conductor leads that wind back and forth across the surface of the chip making contact to each circuit on a chip. In addition, a second clock requires another I/O lead. The circuit of the present invention does not need a second clock, since the clock and data pulse are so related to ensure proper operation, as will be explained later.

Summary of the invention

The invention comprises two IGFET's having a common source and common drain. The common drain and one of the gate electrodes are connected to a source of clock pulses while the other gate electrode is connected to a source of data pulses. The common source is connected to ground through a capacitor with the circuit output taken at the point common to the capacitor and the common source. The clock and data pulses are synchronized so that the trailing edge of the data pulse occurs subsequent to the trailing edge of the clock pulse by a time $\tau$ or greater.

Description of a preferred embodiment

Figures 4, 6, 7:
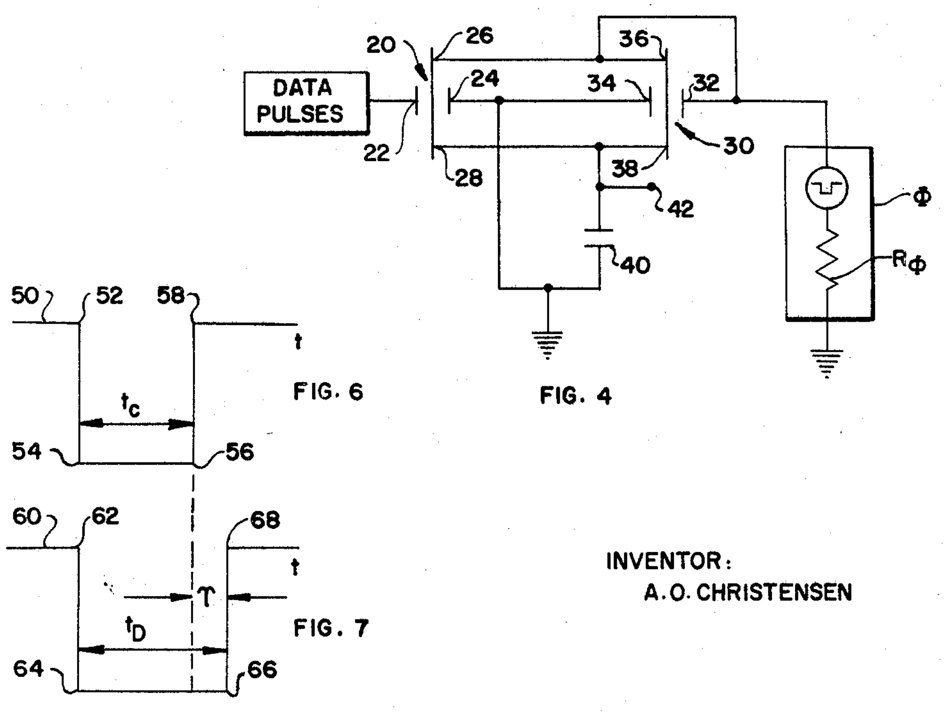
FIGURE 4 is a schematic diagram of a preferred embodiment of the invention.
FIGURE 6 is a time amplitude graph of a clock pulse wave form used with the invention.
FIGURE 7 is a time amplitude diagram of a data pulse wave form used with the invention.

Referring now to FIGURE 4, there is shown a pair of insulated gate field effect transistors 20 and 30. Transistor 20, the data input transistor has a gate electrode 22, a substrate electrode 24, a drain electrode 26, and a source electrode 28. Likewise, transistor 30 has a gate electrode 32, a substrate electrode 34, a drain electrode 36, and a source electrode 38.

Electrodes 26, 32, and 36 are connected to a source of clock pulses, $\phi$, generally having an internal impedance, $R_\phi$, of 50 ohms or less and capable of generating narrow-width fast-rise time pulses. For example, pulses having a width in the range of 5 to 50 nanoseconds are desirable. The pulse width and cycle time are, of course, a matter of some choice, but generally the narrower the pulse width the faster the cycle time and the faster the general operation of the circuit.

In the case of p-channel enhancement mode devices, the clock pulses swing from ground level to a negative amplitude of the order of 4 to 5 times the threshold voltage of the device (threshold voltages are in the neighborhood of 2 to 5 volts). The data pulses swing from ground to a negative amplitude of the order of 2 to 3 times the threshold voltage of the device. Ground level is defined as a logic "zero" ("0") and a negative voltage level is defined as a logic "one" ("1").

Figure 5:
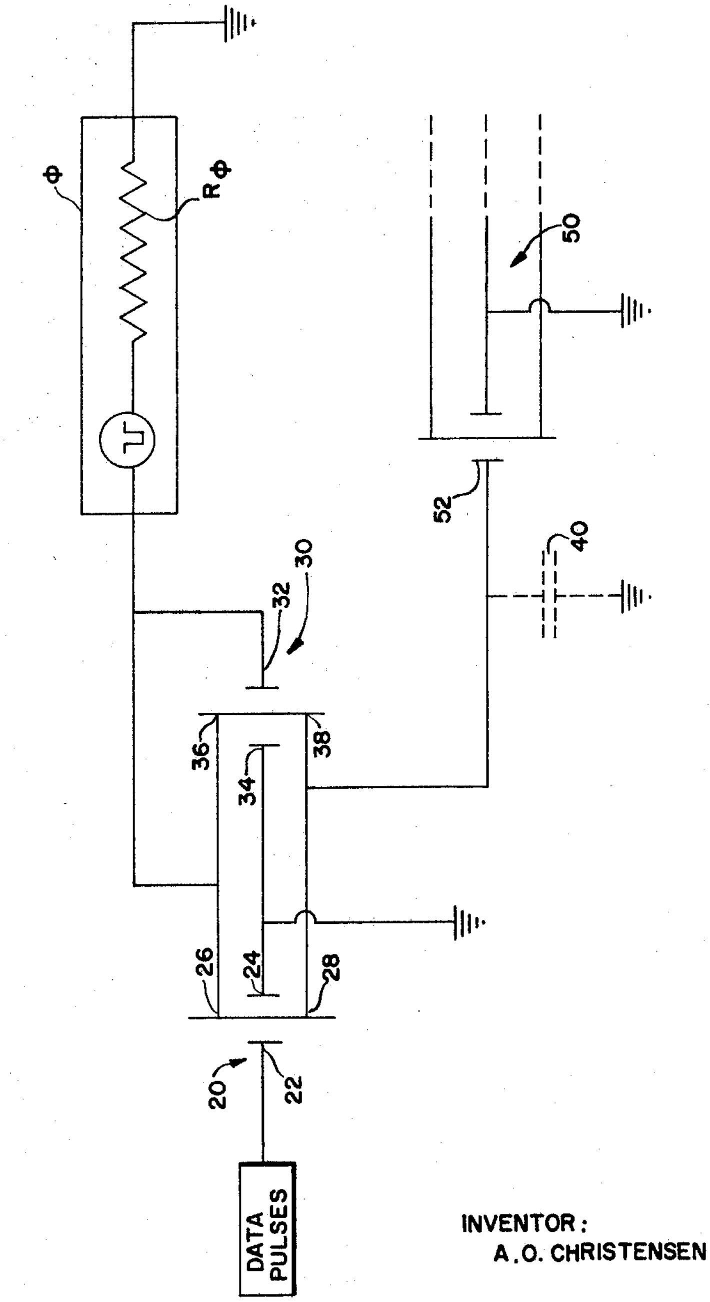
FIGURE 5 is a schematic diagram of the circuit of FIGURE 4 with the input to a following stage also shown.

Source electrodes 28 and 38 are interconnected and tied to ground through a capacitor 40 that may be integrated or discrete. FIGURE 5 illustrates the case where capacitor 40 is physically realized as the gate to ground capacitance of the input transistor 50 to the following stage. With most integrated circuits, the output of one circuit is connected directly to the input gate of another transistor on the same chip. The output of the circuit of FIGURE 4 is shown in FIGURE 5 as connected to input gate 52 of MOSFET 50, which in turn may be the input to another inverter circuit identical to the one shown in FIGURE 4. (The remainder of the circuit not being shown.) The capacitance 40 exists between gate 52 and ground. To physically appreciate why this capacitance exists, it is instructive to refer to FIGURE 2 where it can be seen that oxide 15 acts as an insulating layer between a top capacitive plate consisting of gate electrode 22 and a bottom plate consisting of substrate 10. Capacitive values are of the order of .25 picro farads.

The output 42 of the circuit is taken at the common point between electrodes 28 and 38 and capacitor 40. The substrate electrodes 24 and 34 are connected to ground.

Operation of the circuit

Since the DC power supply has been eliminated from the circuit, all power must be supplied by the clock, $\phi$. Additionally, the clock and data pulse combine to form some very important timing functions that enable the circuit to eliminate the need for a two-phase clock. To fully understand the time wise operation of the circuit it is helpful to refere to FIGURES 6 and 7.

FIGURE 6 represents an idealized graph of a clock signal 50. Signal 50 is at ground potential from time 51 to time 52, at which time it swings sharply negative to its maximum amplitude at 54. The clock signal then remains negative for some time $t_C$ at which time 56 it again returns abruptly to ground at 58. This operation is repeated cyclically and thereby supplies a train of clock pulses to the circuit.

FIGURE 7 is constructed on the same time axis as FIGURE 6 and represents a typical data signal. Data signal 60 is at ground level until time 62 when it swings sharply negative to its full amplitude at 64. The data signal then remains negative for some period of time $t_D$ when it returns sharply to ground potential at 68. This operation is also repeated, not cyclically, but in accordance with the data being presented to the circuit where data consists of either a pulse or lack thereof. Of course, the wave forms of FIGURES 5 and 6 are idealized, and in an actual circuit, rise and fall time would be finite.

Data pulse 60 must remain on for some time $\tau$ after the clock pulse has returned to ground to allow the capacitor 40 to be discharged when a logic "1" is on input 22. The leading edge of the data pulse need not necessarily coincide with the leading edge of the clock pulse, but it is important that the data pulse be on for some time $\tau$ after the clock pulse has returned to ground. The data pulse may take place entirely during the time that the clock signal is at ground; or it may partially overlap the clock pulse on either side; and $t_D$ may be of any length. Indeed, the only conditions under which the circuit will not operate are when the clock and data pulses occur together and the data pulse extends beyond the clock pulse by some time less than $\tau$. But to maximize the speed of operation of the circuit it has been found that the leading edge of the data pulse should occur between times 52 and 58 and the trailing edge should occur substantially $\tau$ seconds after time 58. Typically, $\tau$ will be on the order of several nanoseconds, but will vary with transistors. In any event, $\tau$ must be long enough to permit capacitor 40 to discharge when transistor 20 is conductive after the clock signal has returned to ground.

When a logical "0" is presented to input 22, (i.e. no negative pulse) the circuit works in the following manner: The leading edge of the clock pulse (time 52) causes electrodes 32 and 36 to go negative to the full clock pulse amplitude while electrode 38 is near ground potential. Since the gate electrode 32 potential is lower than the potential on electrode 38 and by an amount greater than the threshold voltage, $V_t$, transistor 30 is switched into the conducting mode and capacitor 40 is then charged through the on-resistance of transistor 30 to a negative voltage substantially equal to the clock pulse amplitude. In actual practice the voltage will divide between capacitance 40 and any parasitic capacitance associated with transistors 20 and 30 that will vary depending on the transistors used. By parasitic capacitance is meant capacitance inherently present in the technology by which a circuit is made. Parasitics, as they are known, exist to a varying degree between electrodes of nearly all transistors, vacuum tubes and the like. But they are generally very small. In the case of MOSFET's, all of the parasitics are of the order of .02 picofarad with the exception of the gate to ground parasitic that is relatively much larger. As explained earlier, the relatively large value of gate to ground parasitic capacitance is used to good advantage in physically realizing capacitor 40. In operation, the clock voltage will divide between capacitor 40 and any parasitics in series therewith between the clock and ground such as the source to drain parasitics of both MOSFET 20 and 30. Thus, it is desirable to have capacitance 40 large with respect to the parasitic capacitances. As a nominal design criterion, a ratio of 10:1 between the capacitances is acceptable, with a greater ratio being desirable. In practice, with integrated circuits, a high ratio is easy to achieve since the source to drain parasitic capacitances are very small and the gate to ground parasitics are at least an order of magnitude larger.

The trailing edge of the clock pulse will turn off transistor 30 and thereby isolate the negative clock pulse voltage on output 42. To avoid any circuit malfunction due to leakage circuit discharge of capacitor 40, the repetition rate of the clock is chosen so as to replenish the charge before it is substantially diminished. Thus, an "0" level input signal has produced a "1" level negative voltage on output 42.

When a logical "1" is presented to the input 22 the circuit works in the following manner: Again the leading edge of the clock pulse switches transistor 30 into the conducting mode and capacitor 40 is charged as in the logical "0" case. Likewise the trailing edge of the clock pulse switches transistor 30 off. But since the negative data pulse is still present at electrode 22 after the clock pulse has returned to ground, electrode 22 will be negative with respect to electrode 26 by an amount greater than $V_t$. And, transistor 20 will continue to be in the conducting mode allowing capacitor 40 to be discharged through the on-resistance of transistor 20 and $R_\phi$ to ground in time $\tau$ thereby leaving the circuit output 42 at a logical "0" level.

Capacitor 40 is charged to a negative voltage by each clock pulse. It is only after the clock has returned to ground for at least $\tau$ time that the logical output of the circuit can be determined. If there is a "0" input, capacitor 40 does not discharge and a "1" level output remains. But if there is a "1" input, capacitor 40 does discharge and the output is "0." In any event the true state of the circuit cannot be determined until the clock has returned to ground long enough for capacitor 40 to discharge if it is going to.

As can be seen from the above discussion, all power for operating the circuit comes from the clock in short pulses. During the time between pulses the circuit receives no power so that unwanted heat is generated only a small percentage of the time. Thus the circuit has the advantage of substantially reducing the heat that must be removed from the circuit.

Since there are no D.C. current paths through the circuit as there were in many prior art circuits, the presence of a D.C. power supply is unnecessary. Consequently an I/O lead and a conductor lead running to all of the circuits is eliminated so that more space on the chip becomes available for additional circuits and the cost per circuit is reduced.

Since a two-phase clock is not necessary for proper operation of the circuit, the second clock I/O lead and conductor are lead eliminated making more chip space available for circuits.

Finally there is no voltage division action across the on-resistances of the transistors as in the case in some prior art circuits. That is, many piror art circuits caused an inversion by dividing a D.C. voltage across the on-resistance of two MOSFET's in series. The output of the circuit was taken at the node between the two MOSFET's and the input was to the gate of the MOSFET electrically closest to ground. If the input MOSFET were off then all of the D.C. voltage would appear at the output. Whereas if the input MOSFET were on, the output would be near ground potential. But in order for this circuit to work properly, the ratio of the on-resistance of the two MOSFET's must be large. But since on-resistance valves are controlled by the physical size of the MOSFET's and since large on-resistance MOSFET's are physically large, this type of circuit is large. Consequently, relatively few of the so-called ratioed prior art circuits can be put on a chip than can the circuit of the present invention since the ratio of the on-resistance of the MOSFET's of the present invention may be 1:1 and the smallest possible MOSFET's may be used.

I claim as my invention:

1. An IGFET inverter circuit comprising:
a first IGFET having gate, drain, and source electrodes;
a second IGFET having gate, drain, and source electrodes;
means for directly interconnecting the drains of said first and second IGFET's;
means for directly interconnecting the sources of said first and second IGFET's;
means for providing capacitance connected between said interconnected sources and ground;
means for supplying clock pulses to said interconnected drains and said gate electrode of said first IGFET, said clock pulses having a leading edge and a trailing edge;
means for supplying data pulses to said gate electrode of said second IGFET, said data pulses having a leading edge and a trailing edge and being so timed with respect to said clock pulse that said trailing edge of said data pulse occurs subsequent to the trailing edge of said clock by at least $\tau$, where $\tau$ is the time required to discharge said means for providing capacitance through said second IGFET; and
output means connected to said interconnected sources.

2. The circuit of claim 1 wherein:
said first and second IGFET's are MOSFET's.

3. The circuit of claim 2 wherein:
said first and second MOSFET's are in the same chip.

4. The circuit of claim 3 wherein said means for providing capacitance comprises:
a parasitic gate to ground capacitance on said chip.

5. The circuit of claim 1 wherein:
said leading edge of said data pulse occurs subsequent to the leading edge of said clock pulse and prior to the trailing edge of said clock pulse and the trailing edge of said data pulse occurs substantially $\tau$ seconds subsequent to said trailing edge of said clock pulse.

6. In a MOSFET integrated circuit array, including a plurality of MOSFET's each having a gate, source, and drain, the inverter circuit comprising:
a first MOSFET;
a second MOSFET;
means for directly interconnecting the drains of said first and said second MOSFET's;
means for directly interconnecting the sources of said first and said second MOSFET's;
output means connected between said interconnected sources and a gate of one of said plurality of MOSFET's in said integrated circuit array;
means for supplying clock pulses to said interconnected drains and said gate electrode of said first IGFET, said clock pulses having a leading edge and a trailing edge;
means for supplying data pulses to said gate electrode of said second IGFET, said data pulses having a leading edge and a trailing edge and being so timed with respect to said clock pulse that said trailing edge of said data pulse occurs subsequent to the trailing edge of said clock by at least $\tau$, where $\tau$ is the time required to discharge said means for providing capacitance through said second IGFET.

References Cited

Boysel and Murphy, "Multiphase Clocking Achieves 100 N-Sec. MOS Memory" Electronics Design News, pp. 50–55. June 10, 1968.

DONALD D. FORRER, Primary Examiner

H. A. DIXON, Assistant Examiner

U.S. Cl. X.R.

307—205, 208